3,564,020
Patented Feb. 16, 1971

3,564,020
PREPARATION OF ANGELICA LACTONE
Donald M. Fenton, Anaheim, Calif., assignor to Union Oil Company of California, Los Angeles, Calif., a corporation of California
Filed July 17, 1968, Ser. No. 745,351
Int. Cl. C07d 5/06
U.S. Cl. 260—343.6     6 Claims

ABSTRACT OF THE DISCLOSURE

Conjugated diolefins bearing a halogen on an unsaturated carbon are reacted with carbon monoxide and water in the presence of a Group VIII noble metal catalyst to prepare unsaturated lactones. A specific embodiment comprises the preparation of angelica lactone from 2-halo butadiene.

---

This invention relates to a hydrocarboxylation process and in particular relates to a method for the carbonylation and cyclization of halogen bearing conjugated diolefins to prepare unsaturated lactones. In a specific embodiment, this invention relates to the carbonylation of halo-butadiene to angelica lactone.

The method of this invention comprises contacting a conjugated diolefin bearing a halogen on an unsaturated carbon with carbon monoxide and water in the presence of a halogen acid and catalytic amounts of a Group VIII noble metal. The contacting is effected at relatively mild conditions including temperatures from 15° to about 300° C. and pressures from 1 to about 1000 atmospheres.

The following reaction illustrates the course of the hydrocarboxylation:

$$HCR=CXCR=CRH + CO + H_2O \xrightarrow{catalyst}$$

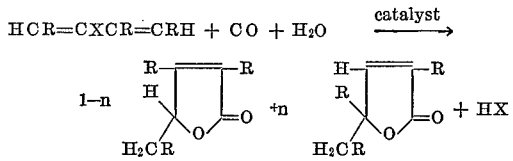

As illustrated, the reaction yields 3,4-position isomers of the lactone product when the R groups are other than hydrogen.

The reactant employed in my invention is a conjugated diolefin bearing a halogen on an unsaturated carbon and having from about 4 to 20 carbons; preferably from about 4 to 12 carbons. The R groups aforeindicated are preferably halogen; however, other inert groups can be present on the diolefin and one or more of the R groups of the aforementioned diolefins can be alkyl, aryl or carboxylic acid or $C_1$ to $C_5$ alkyl esters thereof. The X group represents halogen and can be chloro, bromo, fluoro or iodo. Examples of suitable hydrocarbon diolefins include 2-chloro-1,3-butadiene, 3-methylchloroprene, 3-ethylchloroprene, 3,4-diphenylchloroprene, 3-isopropyl 2-bromo-1,3-butadiene, 2-iodo-1,3-pentadiene, 2-fluoro-1,3-hexadiene, 2-bromo-1,3-pentadiene, 3-chloro-1,3-pentadiene, 1,3-dimethylchloroprene, 2-iodo-1,3-heptadiene, 2-chloro-1,3-hexadiene, 2-fluoro-1,3-pentadiene, 3-chloro-3,5-octadiene, 3 - bromo - 1,3-decadiene, 5-chloro-4,6-tetradecadiene, 5-bromo-5,7-hexadecadiene, 3-iodo-3,5-octadecadiene, etc. Aryl derivatives of the conjugated diolefins can also be reacted including any of the following: 1-phenylchloroprene, 1 - phenyl - 2 - bromo-1,3-pentadiene, 1,4-diphenylchloroprene, 3-m-tolyl-2-iodo-1,3-heptadiene, 1-p-tolyl-2-bromo-1,3-pentadiene, etc.

Examples of inert groups which can be present on the conjugated diolefin reactant include oxygen-containing radicals such as esters and carboxylic acids. Examples of oxo groups which can be included on the reactant diolefin include the carboxylic acids and lower alkyl (1–10 carbons) esters thereof. Examples of suitable acids include any of the following carboxylic acid derivatives of the aforementioned hydrocarbon diolefins: 1-carboxychloroprene, 1 - carboxy - 2 - iodo-1,3-pentadiene, 3-carboxy-4-bromo-3,5-octadiene, etc. Other useful reactants include the lower $C_1$–$C_5$ alkyl esters of the carboxylic acids of any of the aforementioned hydrocarbons such as 3-methoxycarbonylchloroprene, 4 - ethoxycarbonylchloroprene, 4 - butoxycarbonyl - 2 - bromo - 1,3-pentadiene, 2-chloro-4 - methoxycarbonyl - 1,3 - pentadiene, 1-ethoxycarbonyl-1,4-fluoro-3,5-octadiene, etc.

The reaction is performed in the presence of an aqueous hydrohalic acid such as aqueous hydrochloric or aqueous hydrobromic acids. The hydrohalic acid is employed in concentrations from about 1 to about 50 weight percent, preferably from about 5 to about 25 weight percent in the reaction medium.

The reaction is performed under liquid phase conditions in the presence of the aqueous reaction medium which can optionally contain up to about 80 weight percent of an inert organic solvent such as a carboxylic acid, hydrocarbon or ether.

Illustrative of the carboxylic acids that can be included in the reaction medium include carboxylic acids such as benzoic, phenylacetic, acetic, propionic, butyric, isobutyric, pentanoic, hexanoic, pivalic, heptanoic, octanoic, toluic, phthalic acids, etc. Other organic solvents that can be employed include the alkyl and aryl sulfones such as diisopropyl sulfone, butyl amyl sulfone, methyl benzyl sulfone, etc.

Ethers can also be employed as a reaction solvent such as diisopropyl ether, di-n-butyl ether, ethylene glycol diisobutyl ether, methyl-o-tolyl ether, ethylene glycol dibutyl ether, di-iso-amyl ether, ethylene glycol di-iso-amyl ether, diethylene glycol diethyl ether, ethyl benzyl ether, diethylene glycol dimethyl ether, ethylene glycol diphenyl ether, triethylene glycol diethyl ether, tetraethylene glycol dimethyl ether, tetraethylene glycol dibutyl ether, etc.

Various esters can also be employed as a solvent, e.g., methyl acetate, ethyl acetate, ethyl propionate, sec-butyl acetate, iso-butyl acetate, butyl acetate, ethyl formtae, glycol diformate, cyclohexyl acetate, diethyl oxalate, methyl benzoate, diethyl malonate, valerolactone, ethylbenzoate, methyl salicylate, dibutyl oxalate, dimethyl phthalate, benzobenzoate, dibutyl phthalate, etc.

The catalyst for the reaction is a Group VIII noble metal. The noble metal can be of the platinum subgroup including platinum, osmium or iridium, or the palladium subgroup including palladium, ruthenium or rhodium. Of the preceding noble metals, palladium is preferred for its demonstrated greater activity. The Group VIII noble metal can be employed in an amount between about 0.001 and about 5 weight percent of the liquid reaction medium; preferably between about 0.04 and about 2.0 weight percent. The concentration of the platinum group metal in the reaction medium is not critical to the reaction since this material functions as a true catalyst.

The platinum group metal can be added to the reaction medium as a finely divided metal, as a soluble salt or as a chelate. Examples of suitable salts are the halides and carboxylates of the metals such as platinum chloride, rhodium acetate, ruthenium bromide, osmium propionate, iridium benzoate, palladium isobutyrate, palladium chloride, etc. Examples of suitable chelates are palladium acetylacetonate, and complexes of palladium with such conventional chelating agents as ethylene diamine tetra-acetic acid, citric acid, etc.

The catalyst can also be distended on a solid carrier for use in the reaction. To illustrate, an inert solid, i.e., one that is non-reactive with the reactants, products and solvents under the reaction conditions, can be impregnated with catalytic amounts of the Group VIII noble metal. Examples of suitable solids include silica, alumina, titania, zirconia, aluminum silicates such as clays, zeolites, molecular sieves, etc. The catalyst can be impregnated by precipitation of the noble metal onto the carrier from a solution of a soluble salt of the noble metal. This can be accomplished in a conventional manner by evaporation of the solvent or reduction of the solution by contacting it with a reducing agent. A suitable reducing agent would be carbon monoxide or a gaseous olefin such as ethylene, propylene, etc. The carrier can be used in particulate form with particle sizes from about ¼-inch diameter to about 1 micron, as desired. Generally, particles from ⅛ to 1/32 inch diameter can be used. The particles are impregnated with from 0.01 to 10 weight percent of the Group VIII noble metal; preferably from 0.1 to about 1.0 weight percent.

If desired, an iron cocatalyst can also be used. The cocatalyst can be added to the reaction zone or distended on the carrier as a soluble iron salt, e.g., ferric or ferrous halides or carboxylates such as ferric chloride, ferrous bromide, ferric acetate, ferrous valerate, etc. The iron cocatalyst can also be added as finely divided metal or as the carbonyl, triirondodecylcarbonyl. Since iron functions as a cocatalyst, catalytic quantities can be used, from about 0.001 to 5.0 weight of the liquid reaction medium or from about 0.01 to 10 weight percent of the impregnated solid carrier.

The reaction is performed under liquid phase conditions at a temperature from about 15° to 300° C.; preferably from about 25° to 200° C. Sufficient pressure is maintained on the reaction system to insure that the reaction medium is maintained in liquid phase at the chosen reaction temperature. Pressures from about 1 to 1000 atmospheres, preferably from about 10 to 200 atmospheres are preferred. The higher pressures favor the carbonylation reaction by increasing the solubility of the carbon monoxide reactant in the liquid phase. Accordingly, it is desired that the partial pressure of the carbon monoxide comprise at least 1 to about 200 atmospheres. The carbon monoxide can be diluted if desired with suitable inert gases such as nitrogen, helium, carbon dioxide, etc.

The reaction can be performed batchwise or in a continuous fashion. When operating batchwise, the reaction medium containing the catalyst and hydrohalic acid is charged into the reaction zone together with the halogen bearing conjugated diolefin reactant and the reaction zone is then pressured with the carbon monoride reactant and heated to the desired reaction temperature. When practicing the invention in a continuous fashion, the reaction medium containing the catalyst and the hydrohalic acid can be circulated through a reaction zone maintained at the chosen temperature and pressure wherein it is contacted with the halogen bearing conjugated diolefin and carbon monoxide reactants. The product can be continuously recovered from the reaction medium which is withdrawn from the reaction zone by any suitable technique such as distillation, solvent extraction or extractive distillation.

Sufficient reaction time is permitted for the addition of the carbon monoxide and water to the halo-diolefin. The reaction can be monitored by observing the rate of disappearance of the reactant or the formation of the lactone from the halogen bearing conjugated diolefin. This can be simply followed by watching the rate of pressure decrease. The reaction is favored by the presence of the hydrohalic acid and preferably concentrated hydrochloric acid of about 1 to about 12 normal is employed for this reaction.

The crude reaction product withdrawn from the hydrocarboxylation reactor can be processed to recover the desired lactone product therefrom and the other residue which contains the catalyst can be returned for further reaction.

The invention will now be illustrated by the following exemplified disclosure.

EXAMPLE 1

A tantalum bomb is charged with 50 milliliters of a solution of 50 weight percent chloroprene in xylene, 50 milliliters concentrated hydrochloric acid and 2 grams palladium chloride. The bomb is closed, pressured to 1000 p.s.i. with carbon monoxide, then heated to and maintained at 100° C. for 2 hours and then heated to and maintained at 175° C. for an additional 2 hours. Upon completion of the reaction period, the bomb is cooled, its final pressure observed to be 250 p.s.i.g., then depressured and opened. The bomb contents are distilled to recover, as a distillate, angelica lactone, boiling point of 40–50° C., at 1 millimeter mercury absolute pressure.

When the reaction is repeated with substitution of 2-chloro-1,3-hexadiene for the chloroprene, a similar reaction to prepare γ-propyl-α,β-crotonolactones occurs.

When the reaction is repeated with substitution of 3 - m - tolyl - 2 - iodo - 1,3 - heptadiene for the chloroprene, a similar reaction to prepare γ - butyl - γ - m - tolyl-α,β-crotonolactone occurs.

When the reaction is repeated with substitution of 3-methoxycarbonylchloroprene for the chloroprene, a similar reaction to prepare the methoxycarbonyl-γ-methyl-α,β-crotonolactones occurs.

When the reaction is repeated with the substitution of platinum acetylacetonate for the palladium chloride previously used, a similar reaction at a slower rate occurs.

The preceding example is intended solely to illustrate a preferred mode of practicing my invention and to demonstrate results obtainable thereby.

I claim:
1. The hydrocarboxylation of halogen bearing conjugated diolefin compounds having the following structure:

$$HCR=CXCR=CRH$$

wherein X is halogen; and the R groups are selected from the class consisting of hydrogen, and inert alkyl, mononuclear aryl, carboxyl and $C_1C_5$ and mixtures thereof and wherein the total of carbon atoms is from 4 to about 20; which comprises contacting said diolefin with carbon monoxide and an aqueous hydrohalic acid selected from the class consisting of hydrobromic and hydrochloric acids in the presence of a palladium catalyst at a temperature from about 15° to 300° C. and sufficient pressure from about 1 to 100 atmospheres to maintain liquid phase conditions to form an unsaturated lactone having one more carbon than said diolefin.

2. The hydrocarboxylation to produce angelica lactone according to claim 1 wherein said diolefin is 2-halo butadiene.

3. The hydrocarboxylation according to claim 2 wherein said diolefin is chloroprene.

4. The hydrocarboxylation of claim 1 wherein said hydrohalic acid is aqueous hydrochloric acid.

5. The hydrocarboxylation of claim 3 wherein said hydrohalic acid is aqueous hydrochloric acid and wherein said R groups are selected from the class consisting of hydrogen and alkyl.

6. The hydorocarboxylation of claim 3 wherein said hydrohalic acid is hydrochloric acid.

References Cited

UNITED STATES PATENTS

| | | | |
|---|---|---|---|
| 3,065,242 | 11/1962 | Alderson et al. | 260—343.6 |
| 2,911,422 | 11/1959 | Ercoli | 260—533A |
| 3,458,532 | 7/1969 | Hayden | 260—343.6 |

ALEX MAZEL, Primary Examiner

J. A. NARCAVAGE, Assistant Examiner

UNITED STATES PATENT OFFICE
CERTIFICATE OF CORRECTION

Patent No. 3,564,020              Dated February 16, 1971

Inventor(s) Donald M. Fenton

It is certified that error appears in the above-identified patent and that said Letters Patent are hereby corrected as shown below:

Column 4, line 42, "$C_1C_5$" should be -- $C_1-C_5$ --.

Signed and sealed this 31st day of August 1971.

(SEAL)
Attest:

EDWARD M. FLETCHER, JR.            ROBERT GOTTSCHALK
Attesting Officer                  Acting Commissioner of Pa